United States Patent [19]
Hara et al.

[11] 4,388,953
[45] Jun. 21, 1983

[54] METHOD OF AND APPARATUS FOR TWISTING WIRE END

[75] Inventors: Akinori Hara; Hiroshi Mochizuki, both of Akishima, Japan

[73] Assignee: Osawa Press Mdg., Co., Ltd., Tokyo, Japan

[21] Appl. No.: 222,658

[22] Filed: Jan. 5, 1981

[30] Foreign Application Priority Data

Jul. 30, 1980 [JP] Japan .................................. 55-104574
Jul. 30, 1980 [JP] Japan ............................. 55-107988[U]

[51] Int. Cl.³ .............................................. B21F 7/00
[52] U.S. Cl. ..................................... 140/149; 81/9.51
[58] Field of Search ................. 81/9.51; 140/113, 115, 140/118, 119, 149; 27/564.4

[56] References Cited
U.S. PATENT DOCUMENTS

| | | | |
|---|---|---|---|
| 2,645,959 | 7/1953 | Fuchs et al. | 81/9.51 |
| 3,881,374 | 5/1975 | Gudmestad | 81/9.51 |
| 4,241,628 | 12/1980 | Sindelar et al. | 81/9.51 |

*Primary Examiner*—Lowell A. Larson
*Attorney, Agent, or Firm*—Darby & Darby

[57] ABSTRACT

Apparatus for twisting a wire end comprises a wire holder, a twisting means for selectively engaging the wire end, a drive means operable to rotate the twisting means, and an actuator means operable to move one of the wire holder and the twisting means toward the other to allow the twisting means to engage the wire end. The actuator means is operable to move the one away from the other while the drive means rotates the twisting means, thereby twisting the wire end about its axis.

6 Claims, 9 Drawing Figures

METHOD OF AND APPARATUS FOR TWISTING WIRE END

BACKGROUND OF THE INVENTION

1. Field of the Invention

This invention deals with the art of automatically twisting the end of a wire such as an insulated wire.

2. Prior Art

In the electrical and electronic industry, insulated wires have been extensively used to make electrical connections, the insulation being stripped from the wire ends. The stripped ends are usually soldered to terminals, the conductive pattern of printed circuit bases and the like. It has been found desirable to twist the stripped wire ends to facilitate the soldering. One known wire end stripping and twisting apparatus comprises a cylindrical member driven by a motor for rotation about its axis. The cylindrical member contains a stripping and twisting mechanism which comprises a spring-biased cutter blade and a support element positioned in opposed relation to the cutter blade. The cylindrical member has an opening formed through its end, and the cutter blade and the support element are secured to the end adjacent to the opening. For stripping and twisting the wire end, the wire end is manually introduced between the cutter blade and the support element through the opening. The cutter blade is urged toward the support element by a spring so that the wire end is gripped by the cutter blade and the support element. Then, the cylindrical member is driven by the motor for rotation about its axis to cut through the insulation of the wire. At this time, the wire is manually withdrawn from the cylindrical member to strip the insulation from the wire end and at the same time to twist the wire end by the severed insulation, the severed insulation being held by the cutter blade and the support element during this stripping and twisting operation. Thus, the wire must be manually inserted into and withdrawn from the cylindrical member to effect the stripping and twisting operation. Such prior art apparatus has been found not satisfactory from a viewpoint of productivity. Such a manual operation has another disadvantage that the severed insulation fails to be kept to a predetermined constant length.

SUMMARY OF THE INVENTION

It is therefore an object of this invention to provide a wire end twisting apparatus which is capable of automatically twisting the wire end.

Another object is to provide such apparatus whereby the wire end is twisted tightly progressively toward its free end.

According to the present invention, there is provided an apparatus for twisting the end of a wire which comprises a base; a wire holder for holding the wire against movement; a twisting means for selectively engaging the wire end extending outwardly from the wire holder; a drive means on the base operable to rotate the twisting means; and an actuator means operable to move one of the wire holder and the twisting means toward the other to allow the twisting means to engage the wire end, and operable to move the one away from the other while the drive means rotates the twisting means, thereby twisting the wire end about its axis.

Other advantages, features and additional objects of the present invention will become manifest to those versed in the art upon making reference to the detailed description and the accompanying sheets of drawings in which preferred embodiments incorporating the principles of the present invention are shown by way of illustrative examples.

DESCRIPTION OF THE PREFERRED EMBODIMENTS

Figure 1:
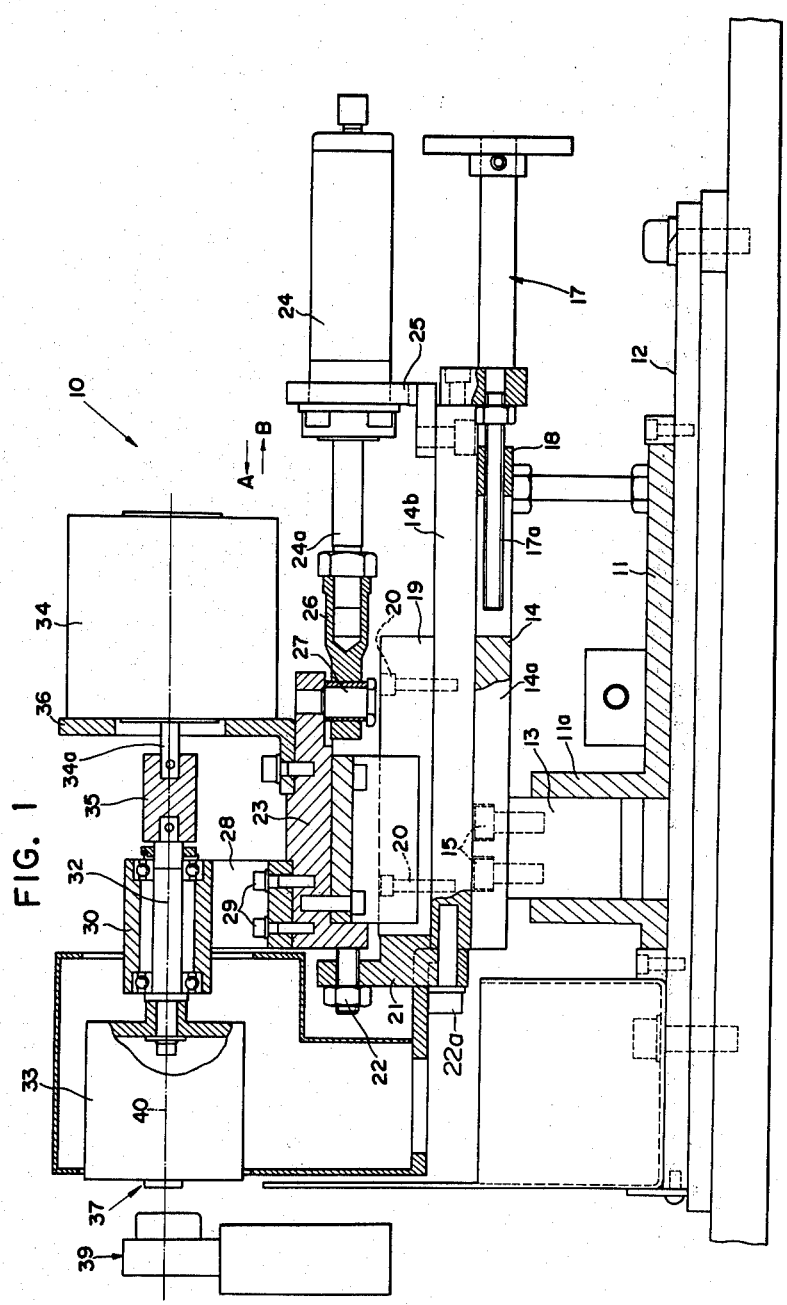
FIG. 1 is a front elevational view of a wire end twisting apparatus.
Figure 2:
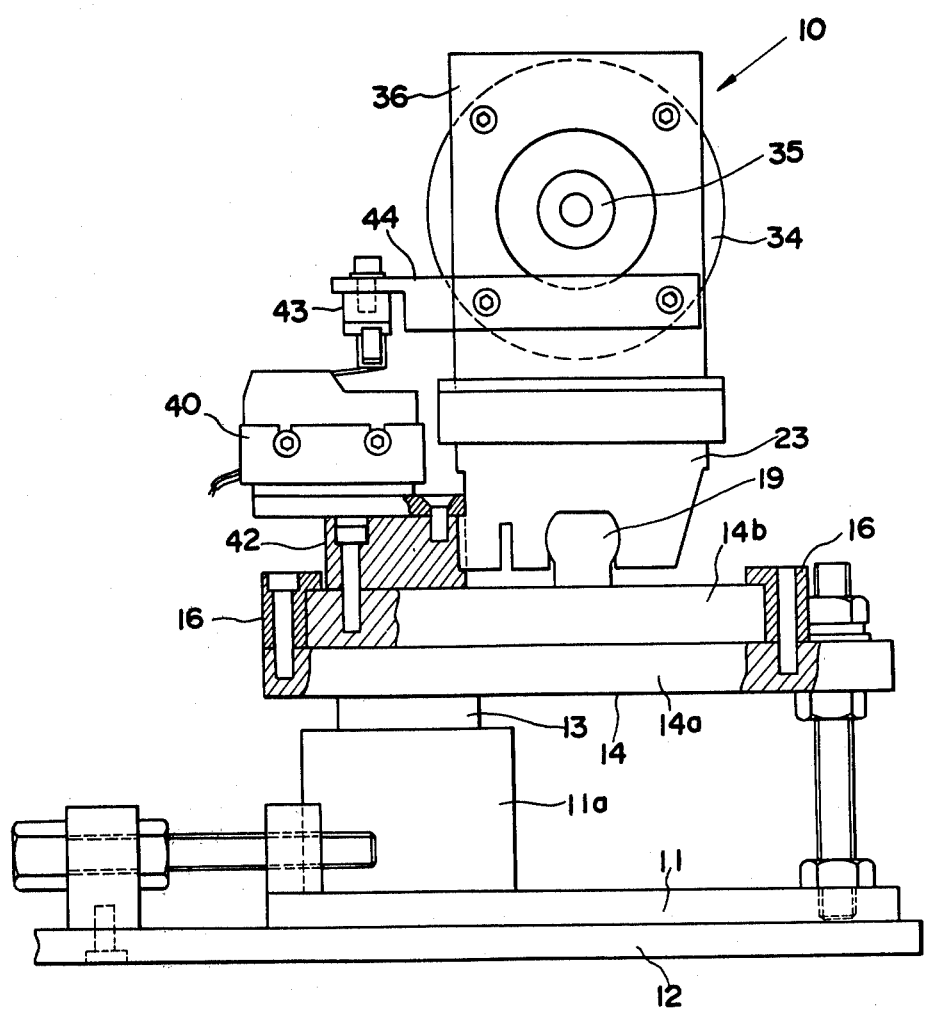
FIG. 2 is a partly-broken end view of the apparatus.
Figure 3:
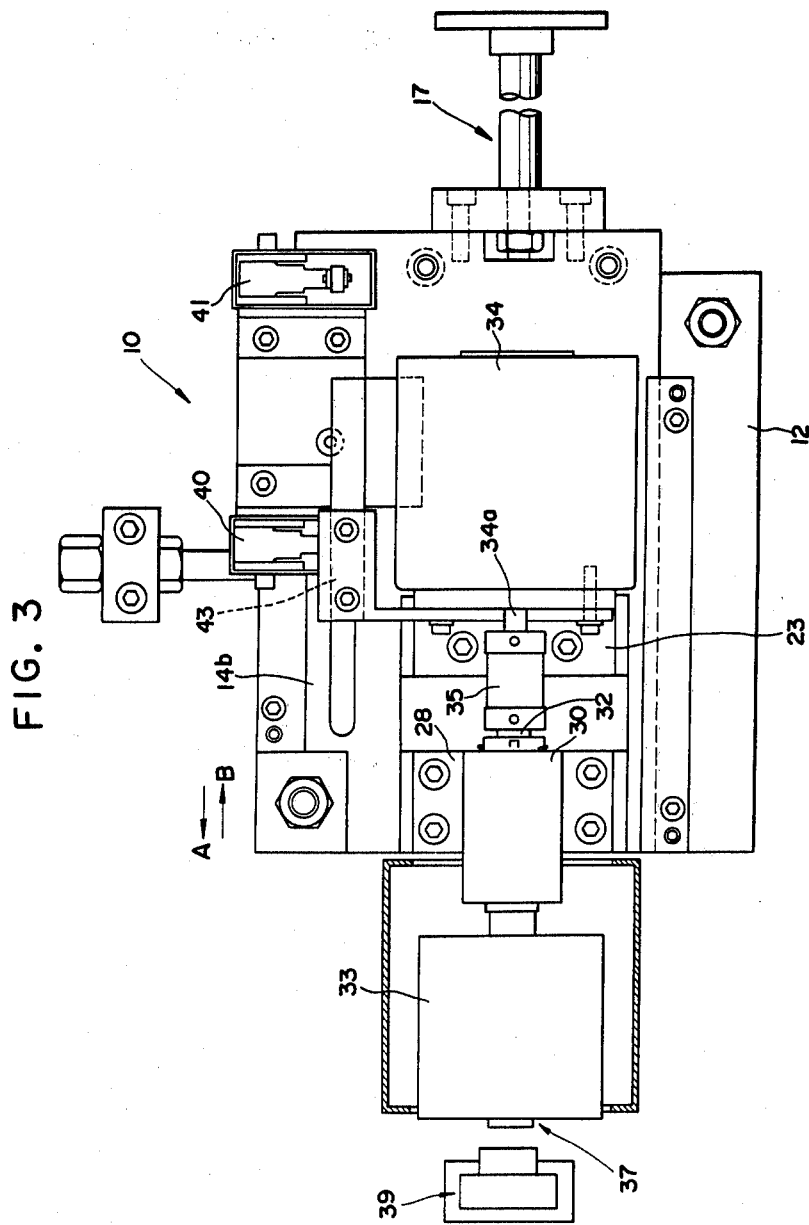
FIG. 3 is a plan view of the apparatus.
Figure 4:
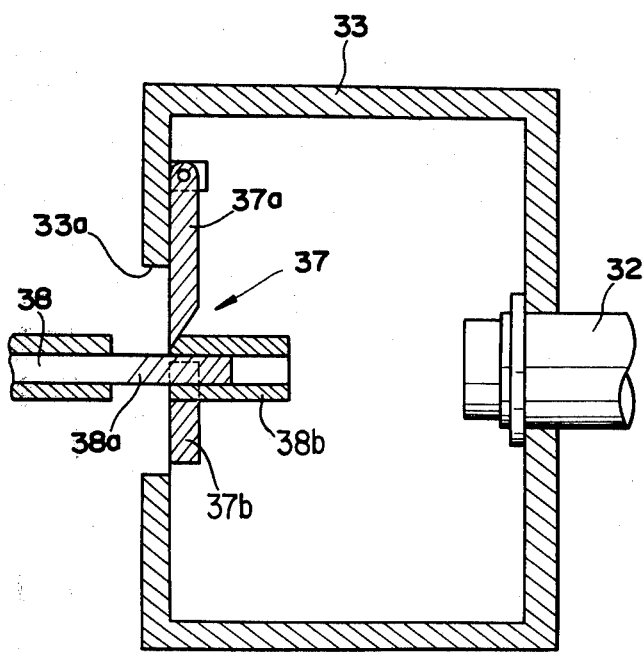
FIG. 4 is a cross-sectional view of a cylindrical member containing a stripping and twisting mechanism.
Figure 5:
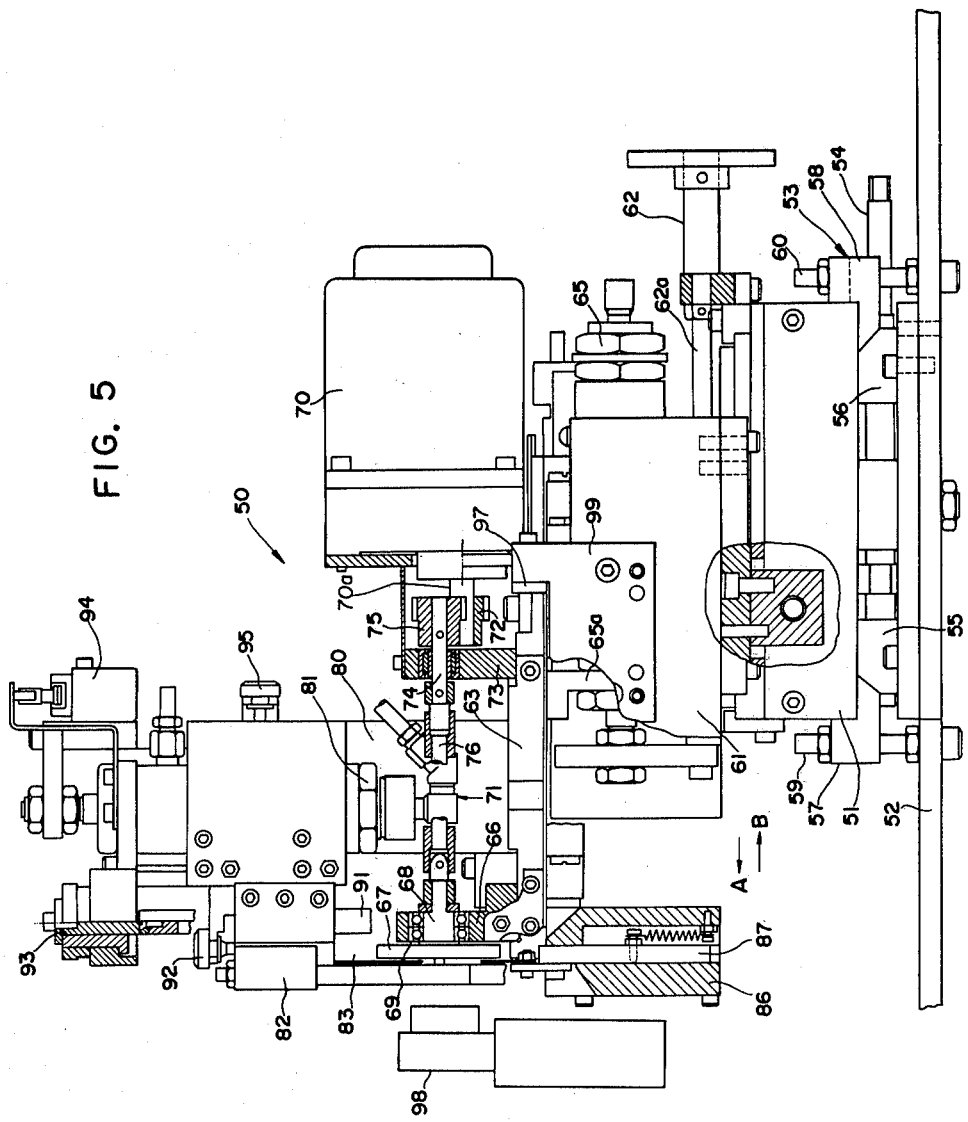
FIG. 5 is a front elevational view of a modified wire end twisting apparatus.

FIGS. 1 to 3 show a wire end twisting apparatus 10 in accordance with the present invention. A support member 11 is mounted on a horizontal base 12 and has a well portion 11a. A mounting block 13 is received in the well portion 11a and movable therealong to adjust the height of the block 13 relative to the base 12. The block 13 is set at a preselected position. A mounting table assembly 14 is mounted on the mounting block 13, the table assembly 14 comprising a lower table 14a secured to the mounting block 13 by bolts 15, and an upper table 14b mounted on the lower table 13a. The upper table 14b is slidable along the lower table 14a in the directions A and B and is guided by guide members 16, 16. The upper table 14b is set at a preselected position by a position adjusting means 17 which has a rotatable threaded rod 17a received in an internally threaded member 18 affixed to the upper table 14b. An elongated guide rail 19 is fixedly mounted on the upper table 14b by bolts 20. An end block 21 is secured to the left end of the upper table 14b (FIG. 1) by bolts 22 and extends uprightly. A screw 22a is threaded through the end block 21.

A carriage 23 is mounted on the guide rail 19 for sliding movement therealong in horizontal directions indicated by arrows A and B. A power cylinder 24 is mounted on the right end of the upper table 14b through a bracket 25. A piston rod 24a is connected to the right end of the carriage 23 through a connecting member 26 and a pin 27. A mounting member 28 is fixedly secured to the carriage 23 by bolts 29, and a bearing member 30 is mounted on the mounting member 28. A shaft 32 extends through and is rotatably borne by the bearing member 30, the shaft 32 being disposed horizontally. A rotatable cylindrical member 33 is fixedly mounted on one end of the shaft 32 for rotation therewith, while a drive shaft 34a of a motor 34 is connected to the other end of the shaft 32 through a coupling 35. The motor 34 is mounted on the carriage 23 through a bracket 36. The cylindrical member 33 contains a stripping and twisting mechanism 37 which comprises a spring-biased cutter blade 37a and a support element 37b positioned in opposed relation to the cutter blade 37a, as shown in FIG.

4. The cutter blade 37a and the support element 37b are secured to the end of the cylindrical member 33 remote from the shaft 32 and disposed adjacent to an opening 33a formed through the end. The end 38a of an insulated wire 38 is introduced between the opposed cutter blade 37a and support element 37b through the opening 33a. The cutter blade 37a is urged toward the support element 37b by a spring (not shown) so that the wire end 38a is gripped by the cutter blade 37a and the support element 37b. The wire is held in position against movement by a wire holder 39. The cylindrical member 33 is rotated about its axis to cut through the insulation only of the wire 38. Simultaneously, the cylindrical member is moved along its axis away from the wire holder 39 to strip the insulation from the wire end and at the same time to twist this wire end by the severed insulation 38b, the severed insulation being hold by the blade 37a and the support element 37b during this stripping and twisting operation.

The wire holder 39 serves to hold the wire 38, the wire 38 extending outwardly toward the cylindrical member 33 a predetermined length. The wire holder 39 is moved toward and away from the cylindrical member 33 by an actuating means (not shown).

A pair of limit switches 40, 41 are mounted on the upper table 14b through mounting means 42. An actuator 43 is mounted on the bracket 36 through a mounting bar 44, the actuator 43 being engageable with the limit switches 40, 41, respectively, to activate the same to control the operation of the power cylinder 24.

A mode of operation of the wire end twisting apparatus 10 is now described. The insulated wire 38 is held by the wire holder 39, and the wire holder 39 is moved in the direction B by the actuating means (not shown) into an operative position, the axis of the wire 38 lying on the axis 40 of the cylindrical member 33. The power cylinder 24 is actuated to extend the piston rod 24a in the direction A so that the carriage 23 is moved along the guide rail 19 in the same direction. Thus, the cylindrical member 33 is moved into an operative position adjacent to the wire holder 39 so that the end 38a of the insulated wire 38 is introduced between and gripped by the opposed cutter blade 37a and support element 37b. During the operation of the apparatus 10, the motor 34 is rotated so that the cutter blade 37a cut through the insulation of the wire end 38a. When the cylindrical member 33 reaches its operative position, the actuator 43 activates the limit switch 40 to move the piston rod 24a in the direction B so that the carriage 23 and hence the cylindrical member 33 are moved in the same direction. The severed insulation 38b of the wire end 38a is held by the opposed cutter blade 37a and support element 37b and is rotated therewith as the severed insulation is being stripped from the wire 38 when the cylindrical member 33 is moved in the direction B. Since the wire 38 is held by the wire holder 39 against movement and rotation, the stripped wire end is twisted by the thus rotatingly moving severed-insulation 38b. Thus, the stripping and twisting operations of the wire end are simultaneously effected. When the carriage 23 reaches its retracted position, the actuator 43 activates the limit switch 41 to deactivate the power cylinder 24. Then, the wire holder 39 is moved in the direction A into its inoperative position where the wire 38 so processed is removed from the wire holder 39. Another wire to be processed is automatically held by the wire holder 39. Then, this cycle of operation is repeated.

With this apparatus, the stripping and twisting operations are simultaneously carried out automatically. And, a predetermined length of the insulation is stripped from the wire end.

FIGS. 5 to 8 show a modified from of wire end twisting apparatus 50. This apparatus 50 serves to strip the insulation from an insulated wire end and to twist the thus stripped end tightly progressively toward the free or distal end of the wire. Thus, with this apparatus, the pitch of twisting becomes finer progressively toward the distal end of the wire.

A mounting block 51 is mounted on a base 52 through a height adjusting assembly 53. Rotatably mounted on the base 52 is a threaded shaft 54 on which a pair of blocks 55, 56 are mounted for movement therealong. A pair of blocks 57, 58 are slidably mounted respectively on shafts 59, 60 which extend perpendicularly from the base 52. Each of the blocks 55, 56 has a cam surface in sliding contact with a cooperating cam surface of the block 57, 58. The mounting block 51 can be vertically moved by rotating the threaded shaft 54 to thereby adjust the height of the mounting block 51 relative to the base 52.

A table 61 of a U-shaped cross-section is mounted on the mounting block 51 for horizontal sliding movement therealong in the directions A and B. The table 61 is set at a preselected position by a position adjusting means 62 mounted on the mounting block 51, the position adjusting means having a rotatable threaded rod 62a operatively engaged with the table 61.

A carriage 63 is mounted on the table 61 for horizontal sliding movement therealong in the directions indicated by arrows A and B. The lower portion of the carriage 63 is received in the table 61 of a U-shaped cross-section. A pair of V-shaped grooves are formed in the confronting surfaces of the table 61. Also, a pair of grooves are formed in the opposite sides of the carriage 63. A pair of guide bars 64, 64 of generally square cross-section are received in respective opposed grooves of table 61 and carriage 63, the guide bars 64, 64 being fixed with respect to the table 61. Thus, the carriage 63 is supported by and is slidably movable along the guide bars 64, 64 in the directions A and B.

A power cylinder 65 is mounted on the table 61 and has a piston rod (not shown). The piston rod is connected to the carriage 63 through a connecting member 65a so as to move the carriage 63 in the directions A and B.

Figure 6:
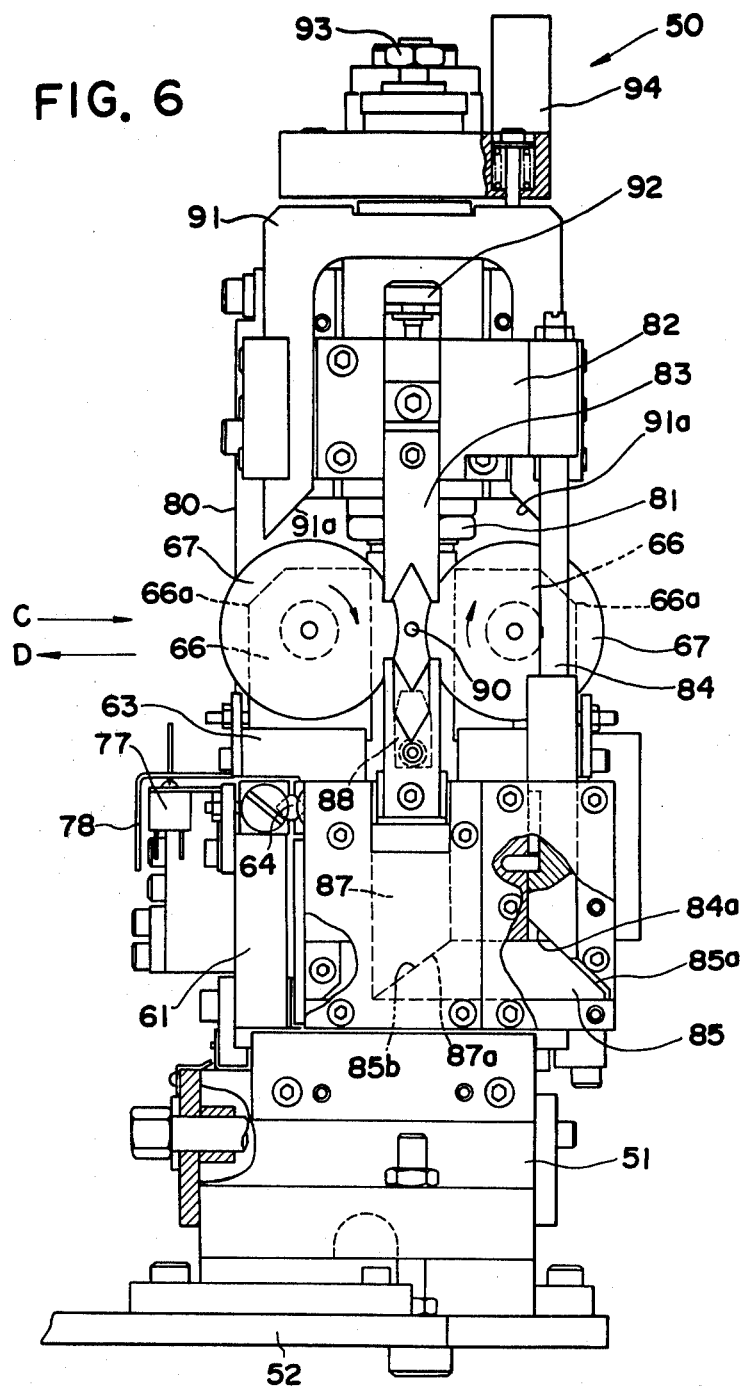
FIG. 6 is a partly broken end view of the modified apparatus.
Figure 7:
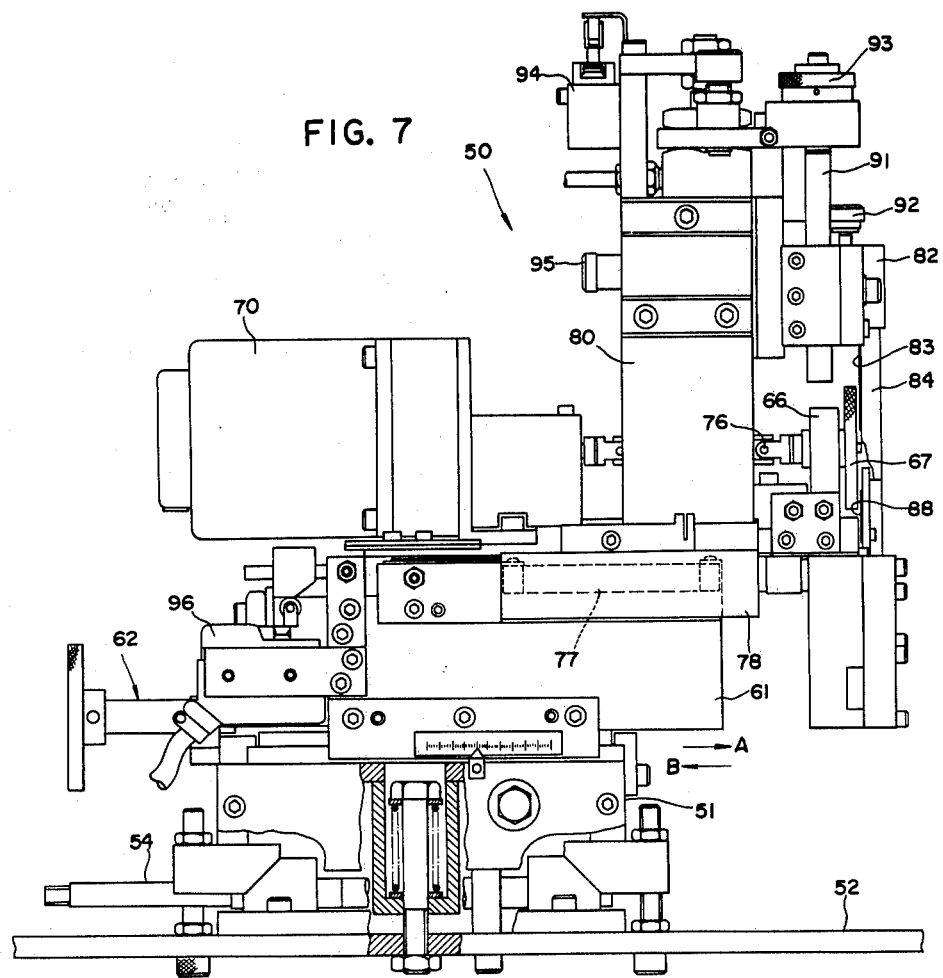
FIG. 7 is a rear elevational view of the modified apparatus.
Figure 8:
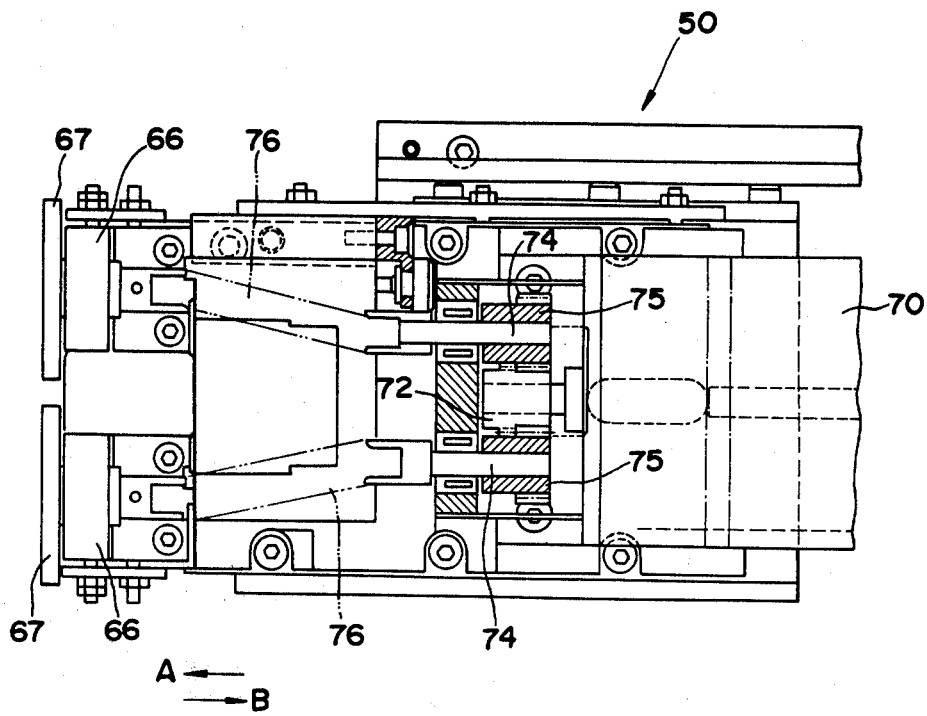
FIG. 8 is a fragmentary, partly broken plan view of the modified apparatus.

A pair of movable members 66, 66 are mounted on the left end (FIG. 5) of the carriage 63 for sliding movement toward and away from each other in the directions C and D (FIG. 6). A pair of rollers 67, 67 are mounted on shafts 68, 68, respectively, which are rotatably supported by the respective movable members 66, 66 through bearings 69, 69. A variable speed motor 70 is mounted on the right end (FIG. 5) of the carriage 63. A drive shaft 70a of the motor 70 is connected to the shafts 68, 68 of the rollers 67, 67 through connecting means 71 so that the motor 70 drives the rollers 67, 67 for rotation. More specifically, a spur gear 72 is mounted on the motor drive shaft 70a. Mounted on the carriage 63 is a support member 73 in which a pair of shafts 74, 74 are journalled, as best shown in FIG. 8. A pair of spur gears 75, 75 are mounted on the shafts 74, 74, respectively, the spur gears 75, 75 being meshingly engaged with the spur gear 72. The shafts 74, 74 are connected to the shafts 68, 68 of the rollers 29, 29, respectively through a pair of universal joints 76, 76. With this arrangement, the variable speed motor 70 drives the rollers 67, 67 even during the movement of the rollers in the directions C and D.

There is provided a control means for feeding a control signal to the variable speed motor 70 to vary the speed of rotation of the motor 70 in response to the movement of the carriage 63. This control means comprises a variable resister or rheostat 77 and a slider 78 in sliding contact therewith to vary its resistance value so that the speed of rotation of the motor 70 and therefore that of the rollers 67, 67 are varied. The rheostat 77 is mounted on the table 61 and extends in the direction of movement of the carriage 63. The slider 78 is mounted on the carriage 63 and disposed in sliding contact with the rheostat 77. This control means is so constructed that the speed of rotation of the motor 70 is increased progressively as the carriage 63 moves along the table 61 in a right-hand direction (FIG. 5), that is, in the direction B, thereby correspondingly increasing the speed of rotation of the rollers 67, 67.

An actuator means is provided for moving the pair of rollers 67, 67 toward and away from each other, that is, in the directions C and D (FIG. 6). The actuator means also serves to operate a stripper for stripping the insulation from the wire end. A support member 80 extends upwardly from the table 61. A power cylinder 81 is mounted on the support member 80 and extends vertically. A movable block 82 is connected to a piston rod of the power cylinder 81 for vertical movement, the movable block being disposed above the rollers 67, 67. An upper stripper blade 83 is mounted on the movable block 82. A vertically disposed rod 84 is mounted on the movable block 82, the rod having at its lower end a cam surface 84a having an inclination of 45° with respect to the axis of the rod 84. A trapezoidal cam member 85 is mounted in the block 86 for horizontal sliding movement, the cam member 85 having at opposite ends a pair of cam surfaces 85a, 85b each having an inclination of 45°. The block 86 is secured to the table 61 through mounting means 99. The cam surface 84a of the rod 84 is disposed in sliding contact with the cam surface 85a. A cam member 87 is mounted in the block 86 for vertical sliding movement and has a cam surface 87a at its lower end. The cam surface 87a is disposed in sliding contact with the cam surface 85b of the cam member 85. A lower stripper blade 88 is mounted on the upper end of the cam member 87. With this arrangement, when the movable block 82 is caused to move downwardly, the rod 84 urges the cam member 85 in the direction D through their cooperating cam surfaces 84a, 85a so that the cam member 87 is in turn moved upwardly through their cooperating cam surfaces 85b, 87a. Thus, the upper and lower stripper blades 83, 88 are moved toward each other to cut through the insulation of the insulated wire 90.

A U-shaped cam member 91 is secured to the movable block 82 for vertical movement therewith and has a pair of opposed cam surfaces 91a, 91a at the lower ends of their arms. The cam surfaces 91a, 91a are engageable with cam surfaces 66a, 66a of the movable members 66, 66, respectively. With this arrangement, when the movable block 82 is moved downwardly, the pair of movable members 66, 66 and hence rollers 67, 67 are moved toward each other through the cam surfaces 91a, 91a and 66a, 66a in sliding contact with each other.

The cam surfaces 91a and 66a has the same inclination of 45° so that the speed of movement of upper and lower stripper blades 83, 88 is equal to that of the rollers 67, 67. When the upper and lower blades 83, 88 cut through the insulation of the insulated wire 90, the pair of rollers 67, 67 are moved into engagement with the severed insulation to positively hold the same therebetween. In this condition, the pair of rollers 67, 67 slightly bite the insulation.

Reference numeral 92 designates a means for adjusting the distance between the upper and lower stripper blades 83, 88, numeral 93 a means for adjusting the coordinate operation of rollers 29, 29 and blades 83, 88, numeral 94 a sensing means for sensing the cutting of the insulation, numeral 95 a means for adjusting the overlapping of the upper and lower blades 83, 88, numeral 96 a means for adjusting the distance of movement of the rollers 67, 67 in the directions C and D, and numeral 97 a means for adjusting the distance of movement of the carriage 63.

A wire holder 98 serves to hold the wire 90 and is movable toward and away from an operative position adjacent to the rollers 67, 67. In this operative position, the wire end is disposed between the rollers 67, 67.

A mode of operation of the wire end twisting apparatus 50 is now described. The wire holder 98 holding the insulated wire 90 is moved into its operative position to introduce the wire end between the pair of rollers 67, 67. Then, the power cylinder 81 is actuated to move the movable block 82 downwardly so that the upper stripper blade 83 and the rod 84 is also moved downwardly. The cam member 85 is moved in the direction C through the cam surfaces 84a, 85a to move the cam member 87 upwardly through the cam surfaces 85b, 87a so that the upper and lower stripper blades 83, 88 are moved toward each other. When the blades 83, 88 are brought into engagement with the insulation of the wire 90, the cam surfaces 91a, 91a of the U-shaped cam member 91 are brought into sliding contact with the cam surfaces 66a, 66a of the movable members 66, 66, respectively, so that the pair of rollers 67, 67 are moved toward each other. The movable block 82 continues moving downwardly so that the upper and lower stripper blades 83, 88 cooperate to cut through the insulation of the wire 90 with the pair of rollers 67, 67 gripping the severed insulation. When the pair of rollers 67, 67 are moved toward each other, the universal joints 76, 76 and the spur gears 75, 75 are moved in the direction B with the spur gears 75, 75 retained in meshing engagement with the spur gear 72 so that the variable speed motor 70 drives the rollers 67, 67 through the spur gears 72, 75 and universal joints 76.

Figure 9:
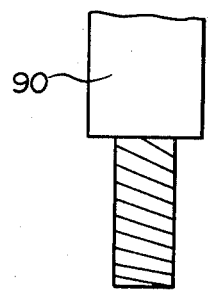
FIG. 9 is a fragmentary view of the insulated wire, showing the wire end twisted with the modified apparatus.

When the pair of rollers 67, 67 are caused to move toward each other, the variable speed motor 70 is energized to drive its shaft 70a for rotation so that the rollers 67, 67 are rotated in the same direction. When the insulated wire 90 is held by the pair of rollers 67, 67, the power cylinder 65 is actuated to move the carriage 63 in the direction B. Therefore, the rollers 67, 67, the universal joints 76, 76 and the variable speed motor 70 are moved in the direction B. Thus, the rotating rollers 67, 67 holding the severed insulation therebetween are moved in the direction B so that the end of the wire 90 is twisted as this rotating severed insulation is stripped from the wire end. Importantly, as the carriage 63 and hence the rollers 67, 67 are moved in the direction B, the slider 78 on the carriage 63 moves along the rheostat 77 to feed a control signal to the variable speed motor 70 to progressively increase the speed of rotation of the motor 70. Therefore, the speed of rotation of the rollers 67, 67 are correspondingly increased gradually, and the wire end is twisted tightly progressively toward its free or distal end. In other words, the pitch of twisting becomes finer progressively toward the distal end of the wire, as shown in FIG. 9. This ensures that the twisted wire end does not become loose of itself. Further, when applying solder to the thus twisted wire end, the solder suitably penetrates into the twisted end to facilitate the soldering operation. Further, the stripping and twisting operations are carried out simultaneously.

While the wire end twisting apparatuses according to the invention have been specifically shown and described herein, the invention itself is not to be restricted to the exact showing of the drawings or the description thereof. For example, the wire holder may be moved away from the stripping and twisting mechanism to effect the stripping and twisting.

What is claimed is:

1. Apparatus for stripping an end of an insulated wire which comprises:
   (a) a horizontal base;
   (b) a wire holder for holding the wire against movement;
   (c) a carriage mounted on said base for horizontal movement along the axis of the insulated wire held by said wire holder;
   (d) a cylindrical member mounted on said carriage for rotation about its axis, the axis of said cylindrical member lying on the axis of the wire held by said wire holder, said cylindrical member containing a wire support element and a stripper blade for cutting through the insulation of the wire end, said support element and said stripper blade being disposed on opposite sides of the axis of the wire held by said wire holder, and said support element and said stripper blade cooperating to hold the severed insulation upon movement of said carriage toward said wire holder;
   (e) drive means mounted on said carriage and operatively connected to said cylindrical member for rotating it about its longitudinal axis; and
   (f) actuator means mounted on said base and operatively connected to said carriage for horizontally moving it toward and away from said wire holder, whereby the wire end is stripped of the insulation and twisted as said carriage moves away from said wire holder.

2. Apparatus for stripping an end of an insulated wire which comprises:
   (a) a horizontal base;
   (b) a wire holder for holding the wire against movement;
   (c) a carriage mounted on said base for horizontal movement along the axis of the insulated wire held by said wire holder;
   (d) a movable block mounted on said base for vertical movement;
   (e) a pair of opposed rollers mounted on said carriage for movement toward each other;
   (f) an upper stripper blade mounted on said movable block;
   (g) first cam means mounted on said movable block for engagement with said opposed rollers to move said rollers toward each other to hold the wire end;
   (h) a lower stripper blade mounted on said carriage;
   (i) second cam means mounted on said movable block for engagement with said lower stripper blade to move it upwardly toward said upper stripper blade when said movable block is moved downwardly;
   (j) first actuator means mounted on said base and operatively connected to said carriage for moving it horizontally toward and away from said wire holder;
   (k) second actuator means mounted on said base and operable to move said movable block vertically; and
   (l) drive means mounted on said carriage and operable to rotate said rollers in the same direction;
   (m) whereby upon downward movement of said movable block, said opposed rollers are moved toward each other to grip the wire end, and said upper and lower stripper blades are moved toward each other to cut through the insulation of the wire, the movement of said rollers toward each other and the movement of said upper and lower stripper blades being effected in a coordinated manner.

3. Apparatus according to claim 2, including a control means electrically connected to said drive means for feeding a control signal to said drive means to vary the speed of rotation of said motor in response to movement of said carriage away from said wire holder to change the pitch of twisting of said wire end.

4. Apparatus according to claim 3, in which the speed of rotation of said drive means is increased progressively as said carriage is moved away from said wire holder.

5. Apparatus according to claim 4, in which said control means comprises a rheostat mounted on said base and a slider mounted on said carriage and held in sliding contact with said rheostat so as to vary its resistance value as said carriage moves away from said wire holder.

6. Apparatus according to claim 2, in which said upper stripper blade has a cam means engageable with said pair of rollers to move the same toward each other.

* * * * *